April 25, 1933.  R. W. CHANDLER  1,905,800
OIL SEAL
Filed Aug. 16, 1932

Witness
Paul F. Bryant

Inventor
Robert W. Chandler
by his attorneys
Van Everen Fish Hildreth & Carey

Patented Apr. 25, 1933

1,905,800

UNITED STATES PATENT OFFICE

ROBERT W. CHANDLER, OF WORCESTER, MASSACHUSETTS, ASSIGNOR TO GRATON & KNIGHT COMPANY, OF WORCESTER, MASSACHUSETTS, A CORPORATION OF MASSACHUSETTS

OIL SEAL

Application filed August 16, 1932. Serial No. 628,995.

The present invention relates to oil seals, and more particularly to self-contained articles of this character which are designed for insertion as an assembled unit in encompassing relation to a rotating shaft or the like along which oil or grease seepage normally takes place.

The purpose and object of the present invention is to provide a strong and substantial seal of this character which is inexpensive to manufacture, and which in its dimensions may be held to relatively close tolerances for accurate fitting within the cooperating parts of a machine such as a motor vehicle.

With this and other objects in view, the various features of the invention consist in certain novel features of construction, combinations and arrangements of parts hereinafter described and claimed, the advantages of which will be obvious to those skilled in the art from the following description.

Figure 1:
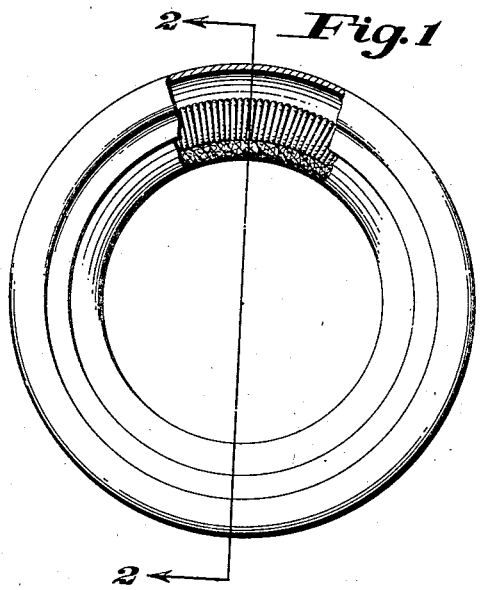
Figure 2:
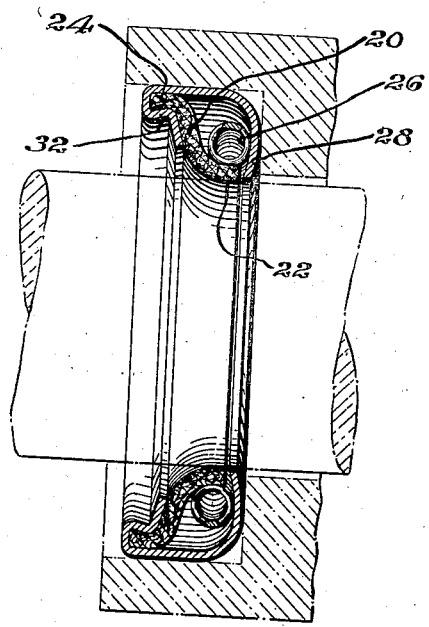
Figure 3:
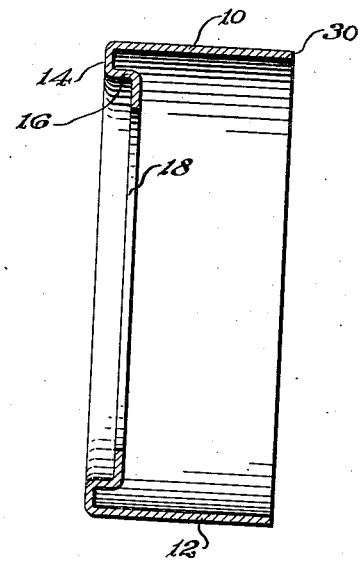

In the accompanying drawing illustrating the preferred form of the invention, Fig. 1 represents an elevation partly in section of the improved seal ring; Fig. 2 is a cross-section on the line 2—2 of Fig. 1, illustrating the ring assembled within a typical housing and shaft assembly; and Fig. 3 is a section in elevation of the shell before assembly, with the flexible packing and sustaining spring.

The ring shown in the illustrated embodiment of the invention comprises essentially a one-piece housing which is drawn and spun by successive operations into the final desired shape, a circular packing of leather or the like which is immovably clamped within the housing, and a retaining spring held within the housing in engagement with the packing to maintain a portion of the latter in sealing engagement with a shaft passing through the housing.

As indicated more particularly in Fig. 2 of the drawing, the housing is completely closed about the outer periphery and is provided with a central aperture somewhat larger than the shaft passing therethrough to afford free passage for the shaft. Clamped within the housing is a circular leather packing having an inner axial portion adapted for engagement with the shaft, and an offset portion rigidly clamped within the housing not only to hold the packing but to seal against leakage of oil and grease between the packing and housing. Assembled within the housing and bearing upon the axially extended portion of the packing is a coiled circular spring of the type familiarly known as a garter spring, intended to produce a yielding engagement between the axial portion of the packing and the shaft. The outer portion of the housing is generally circular, and is held to reasonably close tolerances to accurately fit within the shaft housing or similar complementary part.

According to the present invention, I first form the housing as a drawn shell 10 of steel or the like, having a generally cylindrical portion 12 with an inturned flange 14 provided with a re-entrant portion 16 to form a space for the reception of the packing ring generally circumferential in shape. The flange terminates in a generally radial and inset flange 18, providing a central opening measurably larger than the shaft which the seal encompasses. Cooperating with the housing is a circular packing 20, preferably of leather, which has an inner generally axial portion 22 for sealing engagement with the shaft, and an offset and larger but generally axial portion 24 for reception within the circumferential space in the housing. The two portions of the packing, namely the clamping and sealing portions, are connected by an inclined wall to avoid the formation of sharp or abrupt shoulders in the packing, and offset the reduced portion of the packing in an axial direction from the larger clamping portion. The sealing portion of the packing is engaged by a circular coil spring 26, which constricts the packing and maintains it in yielding engagement with the shaft, the spring being maintained in assembled relation to the packing by the inturned flange 28 formed at the end of the housing opposite the flange 14.

In actual practice, the shell 10 is formed substantially as shown in Fig. 3, and thereafter the packing and spring are assembled therewith, with the sealing portion 24 of the packing extending into the circumferential space. The shell is then subjected to a drawing operation at the open end 30 for the purpose of turning in the flange 28 to approximately the shape shown in Fig. 2, and simultaneously the re-entrant portion 16 is forced outwardly into the inclined position shown at 32 to rigidly clamp the portion 24 of the packing in place and throw the flange 18 inwardly to support the wall of the packing in the manner generally shown in Fig. 2. The two operations may be performed at opposite ends of the housing virtually simultaneously, or as successive operations. In either event, the completed seal is accurate as to dimensions, rigid as to construction, and economical to manufacture. Furthermore, by shaping the packing in cross-section in the general form indicated, the grain face of the packing may be employed for sealing engagement with the shaft, and the body of the packing is not weakened in any way due to its formation, as might otherwise be the case if the packing were formed with abrupt or sharp shouldered portions.

Instead of forcing the re-entrant portion 16 of the shell outwardly for the purpose of clamping the circular packing in position, this may be accomplished by forcing separated sections of the flange outwardly to clamp the offset portion of the packing in position.

What is claimed is:

1. As an article of manufacture, a self-contained seal for insertion as an assembled unit within a housing in encompassing relation to a centrally located shaft, comprising a generally cylindrical housing having an inwardly formed and generally radial flange at one end and an inturned flange at the opposite end having a re-entrant portion to provide spaced concentric walls forming between them a circumferential space, the two flanges providing circular apertures of greater diameter than the shaft passing therethrough, a flexible packing of sheet material having a reduced axially extending portion adapted to encompass and engage with the shaft, an outer and axially extending clamping portion offset radially from the inner portion and assembled and clamped within the circumferential space, and a circular spring engaging with the reduced axial portion of the packing and maintained in assembled relation therewith by the housing for maintaining the packing in yielding engagement with the shaft.

2. As an article of manufacture, a self-contained seal for insertion as an assembled unit within a housing in encompassing relation to a centrally located shaft, comprising a one-piece housing portion of generally circular conformation having an inwardly extended and generally radial flange at one end and an inturned and axially extending portion at the opposite end to provide a circumferential clamping space within the wall of the housing, a flexible circular packing of sheet material having an axially extending portion to encompass and engage with the shaft passing therethrough, and an axial clamping portion larger than the shaft-engaging portion and sealed within the clamping space between the walls of the housing, and resilient means for yieldably engaging the axially extending portion of the packing to cause the latter to engage and seal the shaft passing therethrough.

3. As an article of manufacture, a self-contained seal for insertion as an assembled unit within a housing in encompassing relation to a centrally located shaft, comprising a one-piece cylindrical housing portion having an inwardly extending radial flange at one end and an axially extending portion turned inwardly from the opposite end of the housing to provide a circumferential clamping space within the wall of the housing, a flexible circular packing of sheet material having an axially extending sealing portion to encompass and engage with the shaft passing therethrough, and an axial clamping portion of larger diameter received within and clamped between the two spaced walls of the housing, and a spring located within the housing and yieldably engaging with the axially extending portion of the packing to cause the latter to engage and seal the shaft passing therethrough.

4. As an article of manufacture, a self-contained seal for insertion as an assembled unit within a housing in encompassing relation to a centrally located shaft, comprising a one-piece cylindrical housing portion having an inwardly extending radial flange at one end and an axially extending portion turned inwardly from the opposite end of the housing to provide a circumferential clamping space within the wall of the housing, a flexible circular packing of sheet material having an axially extending sealing portion to encompass and engage with the shaft passing therethrough, and an axial clamping portion of larger diameter received within and clamped between the two spaced walls of the housing, the packing being of generally S-shaped section, and a spring located within the housing and yieldably engaging with the axially extending portion of the packing to cause the latter to engage and seal the shaft passing therethrough.

In testimony whereof I have signed my name to this specification.

ROBERT W. CHANDLER.